United States Patent [19]
Fuller

[11] 3,792,332
[45] Feb. 12, 1974

[54] INTERFACE FOR MULTIPLEX MOTOR CONTROL SYSTEMS

[75] Inventor: Howard J. Fuller, Shrewsbury, Mass.

[73] Assignee: Worcester Controls Corporation, West Boylston, Mass.

[22] Filed: Aug. 14, 1972

[21] Appl. No.: 280,301

[52] U.S. Cl................ 318/562, 318/102, 318/103, 318/681
[51] Int. Cl. ........................................... G05b 11/32
[58] Field of Search ............. 318/562, 102, 103, 681

[56] References Cited
UNITED STATES PATENTS

| | | | |
|---|---|---|---|
| 3,417,235 | 12/1968 | Clark et al. | 318/562 X |
| 3,426,259 | 2/1969 | Ziehm | 318/102 |
| 3,454,880 | 7/1969 | Ries et al. | 318/562 X |
| 3,195,554 | 7/1965 | Hanna | 318/562 X |
| 3,274,553 | 9/1966 | Oya | 318/562 X |
| 3,626,385 | 12/1971 | Bouman | 318/562 |

Primary Examiner—T. E. Lynch

[57] ABSTRACT

A process control interface unit comprises first, second, and third AND gates each of which has a plurality of input terminals and at least one output terminal. A computer or control box selectively energizes different ones of a plurality of parallel control lines to designate a control function to be performed. The input terminals of the first gate are coupled to selected ones of said control lines respectively; the output terminal of the first gate is coupled in parallel to an input terminal of each of the second and third gates; other selected ones of the lines are coupled in parallel to all but one of the remaining input terminals of each of the second and third gates; a further selected one of said lines is coupled to the remaining input terminal of the second gate; and a still further selected one of said lines is coupled to the remaining input terminal of said third gate. At least one controller is coupled to the output terminals of the second and third gates to perform a desired control function.

16 Claims, 4 Drawing Figures

INTERFACE FOR MULTIPLEX MOTOR CONTROL SYSTEMS

BACKGROUND OF THE INVENTION

In many industrial processes, it has become increasingly important to incorporate automatic controls into process control systems. The reasons for this are as varied as the processes involved, i.e., automatic controls may be employed to eliminate or minimize human error, for reasons of ecology, product purity, safety, economics, etc.; but in the final analysis, such automatic controls are employed simply to achieve improved control of the process involved.

One method which has been employed heretofore to achieve such improved control involves utilization of a computer for control purposes. Known process control systems employing computers, however, have been limited to thos processes that could justify the cost of a computer and its associated system components; and in many cases the controlled equipment has had to be specifically designed and built for use with a particular computer. With advancement in computer state of art and techniques, computers are now available that can be economically justified by a much larger segment of the process control industry, but a serious problem has nevertheless persisted in that the type of equipment which the computer is ultimately to control is normally in capable of direct interface to the computer's logic output. As will appear hereinafter, it is the purpose of this invention to obviate this problem through the provision of a novel circuit structure capable of interfacing many of the standard components normally used in a process control system directly with a computer output, without the need for the software packages generally required to convert the computer logic and power levels to types of control systems and power levels required by the control components.

In addition, while a computer is inherently capable of controlling many individual external components, a deterrent to the widespread use of computers in process control systems is the physical size, component costs, and labor costs involved in control/command distribution between the computer, software packages, and the components to be controlled. It is not uncommon for the software and distribution systems to be several times the size and cost of the computer. In general, therefore, while many processes can be made possible or profitable only by use of computer control, the only processes which can, as a practical matter, use such control are those which are capable of justifying the costs of the computer, software and installation involved. As will appear hereinafter, the present invention in many instances obviates this problem as well by eliminating many of the software packages at the computer, greatly simplifying the computer-to-component wiring requirements, with a considerable decrease in distribution wiring components and labor costs, thereby making computer control more readily available for the control of a wider variety of processes.

In many control systems the number of components which must be controlled is comparatively small in relation to the computer's capability. A usual process system consists of a number of self-contained control loops designed to be manually monitored and adjusted for process variables and format. Computerization of the process in most cases merely substitutes the computer for a man, in that the computer now electronically monitors the process and electronically adjusts the equipment in the individual control loops. All of the equipment in the individual control loops must be retained, although the computer's processing and control capabilities could eliminate the need for such equipment; but the lack of any "off the shelf" equipment to directly interface the computer with the controlled components dictates that the computer indirectly controls the process by modification of the process information feeding the individual control loops.

Another purpose of the present invention is, accordingly to provide a direct interface capability between the computer and the controlled components, eliminating all of the equipment in the individual control loops by allowing the computer to provide the same processing and control requirements on a digital basis.

SUMMARY OF THE INVENTION

The present invention relates to an improved interface unit capable of achieving the various advantages and improvements discussed above, as well as others which will become apparent. The unit permits the cost of wiring and installation to be dramatically reduced. For example, to control up to 1000 valves, motors, solenoids, etc., from the typical 16 bit output normally associated with computers used for process control, one 16-wire cable can be routed from the computer output to all the control components in question. Indeed, as will also become apparent, the interface of the present invention need not even be employed with a computer, i.e., a simple central control station unit can be provided which allows an operator to selectively address and command any one of the control components of the system via the aforementioned cable. In addition, the unit is one which employs power levels which are within intrinsically safe operating levels.

The interface of the present invention utilizes standard digital logical components wired in such a way as to be operationally compatible with the type of logic and power output capabilities of industrial type computers. As a part of the complete unit, the digital logic components can include, and be capable of operating, a device such as a relay, power transistor, silicon controlled rectifier, triac, optical couplings, etc., to increase or convert the power handling capabilities of the device as a whole to the type of power, and the level of power, required by such control system components as motors (AC and DC), solenoids, relays, etc. Isolation may also be provided between the input and output circuits of the unit as a whole, thereby providing protection to the lower power, low voltage components of the unit, and preventing the occurrence of "ground loops" or feedback of undesirable power into the computer circuits which might disrupt the operation of the computer or possibly destroy components in the computer.

The interface unit incorporates logic components wired to perform the function generally termed "decoding". The output of the decoding circuit is wired to control the functioning of the power control portion of the unit as a whole. In operation, the power control portion allows direct interface with computer output circuits, while the decoder portion greatly reduces the number of wires needed to control a multiple amount of external components by allowing many components to share the same control wires; and the unit becomes operational only upon application of a correctly encoded signal at the input of the unit's decoder.

In a preferred form of the invention, the input terminals of the interface unit are adapted to be connected to selected ones of a series of control lines, preferably bundled together as a cable, which lines are individually and selectively energized by an appropriate remote control box or by the output of an industrial type computer. The control lines are subdivided into at least first and second distinct groups of lines, or into three different groups of lines, in dependence upon the type of input logic employed. In one example which will be discussed hereinafter, the control lines can be subdivided into one group of ten "address control" lines, a second group of four "group control" lines, and a third group of two "command control" lines; and by using three selected lines out of the group of ten, and one selected line out of the group of four, the interface unit can properly address any selected one of up to 480 individual units, with the remaining group of two lines being employed to command the performance of either of two different functions. If the aforementioned "address control" and "group control" lines are treated as a single group of 14 lines, the interface unit can, by using a selected four lines out of these 14, address up to 1162 individual units and, through the agency of the remaining group of two lines, command the addressed unit to perform either of two different functions.

The control interface circuit itself comprises first, second, and third AND gates, each of which may be constituted by a NAND gate and associated inverter to permit use of commercially available high level logic elements. Each of the said AND gates has a plurality of input terminals and an output terminal. When the aforementioned parallel control lines are subdivided into three distinct groups of lines, the input terminals of the first gate are coupled to different selected ones of the "address control" lines in the first group of lines. The output terminal of the first gate is coupled in parallel to a first input terminal of each of the second and third gates; and selected ones of the "group control" lines, in the second group of lines, are coupled in parallel to all but one of the remaining input terminals of each of the second and third gates. A selected one of the lines in the third, "command control" group of lines is coupled to the remaining input terminal of the second gate, while a different selected one of the lines in said third group of lines is coupled to the remaining input terminal of the third gate.

Controllers are coupled to the output terminals of the second and third gates; and these controllers are adapted to perform a predetermined control function in dependance upon the states of energization of the output terminals of the second and third gates, as determined in turn by the states of energization of the selected control lines in the aforementioned first, second, and third, groups of lines. The term "controller" as employed herein, and in the appended claims, is not limited to any specific type of output apparatus, and is intended to designate any appropriate apparatus responsive to an electrical signal produced at the output of the second and/or third gate of the interface unit. The "controllers" can typically constitute motors, relays, solenoids, parameter sensors, etc. Moreover, the ultimate control function need not be electrically actuated, e. g., an electrically responsive device, such as a solenoid, can control some other form of motive energy such as a pneumatic supply or the like.

A number of interface units, of the type described above, are used simultaneously, and the various input terminals of the several interface units are connected to appropriate ones of the aforementioned control lines, with the output terminals of the several interface units being connected to appropriate components to be controlled. Such an arrangement permits comparatively small computers (or relatively simple control boxes) to be used in a wide variety of control systems, by providing an inexpensive "off-the-shelf" unit capable of interfacing standard control components directly to the computer, thereby eliminating costly custom software. The system, moreover, reduces the amount of wiring between the control point and the controlled components by responding to a simple address and command code; and the units, in addition, reduce the cost of wire and wiring installation still further since the low voltage, low current circuits employed allow a multiple wire cable to be run instead of many individual wires, with such a cable being adapted to be run to signal wiring standards rather than to 120 volt AC standards.

DESCRIPTION OF THE PREFERRED
EMBODIMENTS

Figure 1:
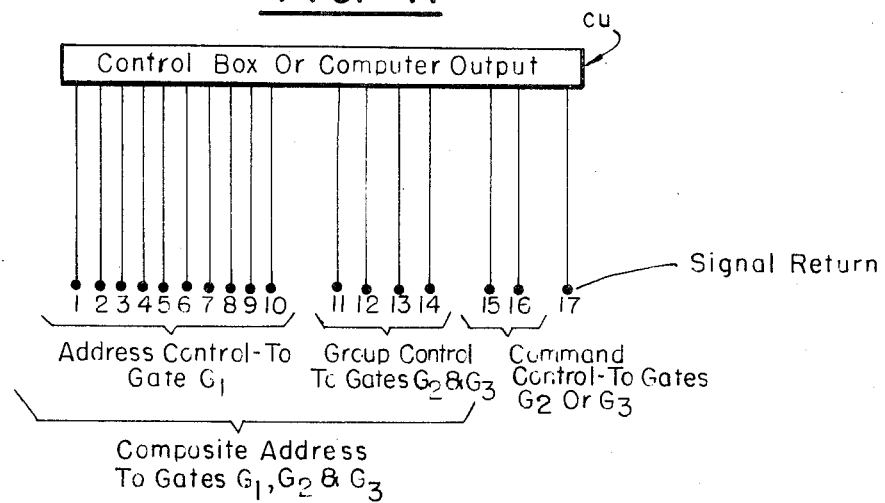
FIG. 1 is a schematic representation of a typical control line array used to control the interface units of the present invention.

FIG. 1 illustrates, schematically, one form of control line arrangement which can be employed in the present invention. Control signals are derived from a control unit CU located at a position remote from the various controlled components, and taking the form of a control box having appropriate means (e.g. pushbuttons or switches) for generating a desired signal pattern. Alternatively, said unit CU may comprise a computer, e.g., of the industrial type, adapted to produce a pattern of signals at its output terminals. In FIG. 1, it has been assumed that the unit CU has an output capability of a 16 bit word, but it will be appreciated that this capability may be varied, e.g., increased or decreased, without affecting the basic principles of the present invention.

The output terminals of unit CU are coupled to 17 lines which, in the preferred form of the invention, comprise a cable. Lines 1 through 16 inclusive represent individual outputs, with line 17 acting as a common circuit return line for all the outputs. Line 17 could take the form of a separate wire in the cable or it could take the form of a shield surrounding the output wires. In some critical applications, moreover, line 17 might take the form of 16 return wires, i.e., one return wire per output circuit. Output circuit coding is accomplished by the computer CU through its programming format.

Figure 2:
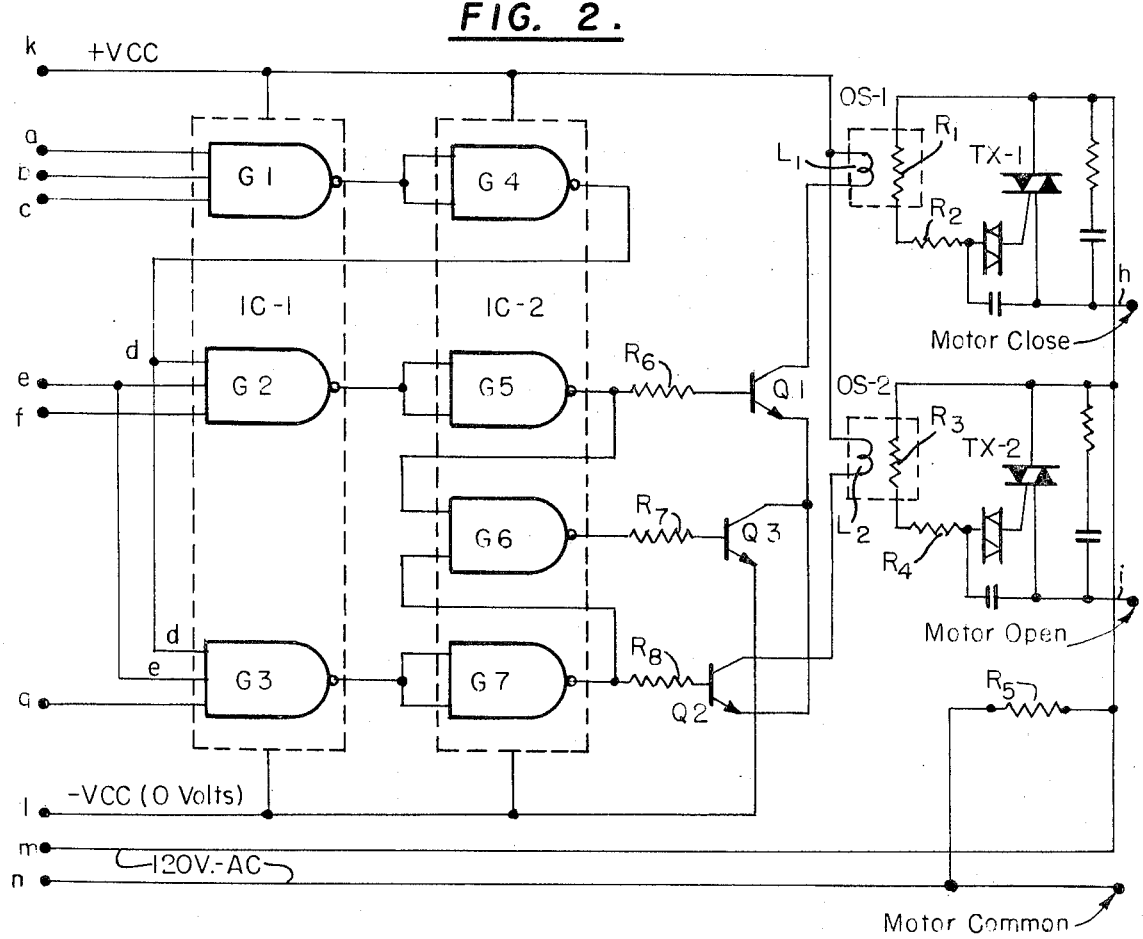
FIG. 2 is a circuit diagram of a typical interface unit constructed in accordance with the present invention.

Wires 1 through 10 have been designated "address control" lines; and three of these ten lines are connected to the input terminal of gate G1 (to be described in reference to FIG. 2). Lines 11 through 14 have been designated "group control" lines; and a selected one of these lines is connected in parallel to an input terminal of each of gates G2 and G3 (also to be described in reference to FIG. 2). Lines 15 and 16 are designated "command control" lines; and one of these lines is connected to an input terminal of gate G2, while the other line is connected to an input terminal of gate G3.

As will appear hereinafter, the basic logic of the interface unit allows a computer having a 16 bit word output to perform 960 operations using only the 16 control lines illustrated in FIG. 1. The use of lines in the "group control" configuration (lines 11–14) allows for simultaneous operation of two or more external components. The need for a group configuration, and how many wires should be used in it, is determined by the process requirements and/or the program designer's convenience in setting up the program. More particularly, if the lines 1 through 10 and 11 through 14 are not treated as separate groups of lines, and if lines 1 through 14 inclusive are, instead, considered as a single group of lines with four out of the fourteen being used for address purposes (the "composite address" notation of FIG. 1), the interface unit of the present invention has the capability of addressing as many as 1162 individual units, and has the capability of performing an even higher number of operations, using only 16 control lines.

In the particular configuration shown in FIG. 1, four lines, of lines 1 through 14 inclusive, must be energized to identify the control unit which is to be activated. The control unit (FIG. 2) is, in turn, capable of two output controls, e.g., one output could energize a motor to generate clockwise rotation, while the other output could energize that same motor to produce counterclockwise rotation. If the motor employed is an electric valve actuator, the overall system could, by energizing four selected ones of the lines 1 through 14 inclusive, and a selected one of the lines 15 and 16, cause a particular valve to either open or close as may be desired. Thus, in the particular form of the invention shown in FIGS. 1 and 2, five of the 16 control lines must be energized to complete each operation. It will be appreciated, however, that different programs could require more or fewer lines to be energized to complete each operation.

The interface unit itself is shown in FIG. 2. One such interface unit would be installed at the location of each controlled component; and the input terminals of these various interface units would then be connected to selected ones of the control lines in a single 16-wire control cable running from the computer in a loop past all of said controlled components. Terminal boxes are preferably spaced along the cable at positions corresponding to each controlled location to facilitate tapping off of the cable to the various interface units. By such an arrangement, and depending on the format necessary for the control language, up to, for example, 1600 operations could be individually controlled by the computer through the provision of only one 16-wire cable, instead of requiring 1600 individual lines.

FIG. 2 depicts the logic components and basic circuitry employed at each interface unit. The power control portion of the unit is adapted to convert the direct current computer output signals to a controlled 120 volt AC adapted in turn to operate an appropriate controller, such as a reversible motor. Conversion from DC signals to AC power control is accomplished, in the unit, by using solid state devices such as Triacs. Isolation between the input control signals, and output AC power, is effected through the use of optical coupling devices.

The logic portion of the unit consists of triple input NAND gates and inverters, connected to perform the AND logic function. NAND logic has been selected for use in the FIG. 2 circuit since it represents the most readily available and widely used logic elements. It will be appreciated that the particular triple input gate configurations shown in FIG. 2 are not mandatory; and other gate configurations could be used, e.g., double input gates, four or five input gates, etc., to accommodate a variety of decoding and control requirements. In addition, other logic components such as flip flops, shift registers, decoders, ring counters, etc., could be incorporated to increase the decoding capabilities of the circuit, or to perform more complex control functions. In short, while FIG. 2 illustrates a preferred form of the present invention, it must be understood that the circuit is depicted in its basic form only, and is subject to many variations which will be readily apparent to those skilled in the art.

In the particular form of the invention shown in FIG. 2, input gates G1, G2, and G3 constitute NAND gates formed on a common integrated circuit panel IC–1; and the outputs of these three gates are connected to three further gates G4, G5, and G7, operating as inverters and formed together on a second integrated circuit panel IC–2. These elements are mounted on a printed circuit board which, typically, has dimensions of approximately two inches by four inches; and the circuit board, in addition to carrying the integrated circuit panels IC–1 and IC–2, mounts a number of additional discrete components constituting the resistors, transistors, optical couplers, Triac, etc., shown in FIG. 2. This particular packaging technique is not intended to limit the present invention, and different arrangements could be employed, e.g., all of the gates and associated components could be manufactured in a single integrated package fabricated on an appropriate chip. Each printed circuit board is located at a controlled location, on or near the electrical actuator or controller employed, with the printed circuit board having its input terminals connected to the aforementioned cable, and its output terminals connected to its associated controller or controllers.

Each printed circuit board (see FIG. 2) includes three input terminals $a$, $b$, $c$, comprising input terminals of the gate G1, and adapted to be connected to three selected ones of the ten address control lines 1–10 (FIG. 1). The output of gate G1 is coupled to inverter G4, the output of which is in turn connected in parallel to input terminals d of gates G2 and G3. A further input terminal e is connected in parallel to the inputs of gates G2 and G3, and is adapted to be connected to a selected one of the group control lines 11–14 (FIG. 1). Gate G2 also has an input terminal f adapted to be connected to a selected one of the command control lines 15–16; and gate G3 has a further input terminal g adapted to be connected to the other of the command control lines 15–16.

The output of gate G2 is coupled to the input of inverter G5; and the output of G5 is connected to one input of gate G6 and, via resistor R6, to the base of transistor Q1. In similar fashion, the output of gate G3 is connected to the input of inverter G7, the output of which is connected to a second input of gate G6 and, via resistor R8, to the base of transistor Q2. The output of gate G6 is connected, via resistor R7, to the base of transistor Q3, the emitter-collector circuit of which is connected in series with the emitter-collector circuits of each of transistors Q1 and Q2. As will appear hereinafter, gate G6 and its associated transistor Q3 represents a safety circuit that prevents inadvertent application of simultaneous open-close signals, to terminals $f$ and $g$, from damaging a motor coupled to the output terminals h and i of the interface unit.

The collector of transistor Q1 is connected to one side of a lamp L1 in optical coupler OS–1. Similarly, the collector of transistor Q2 is connected to one side of lamp L2 in optical coupler OS–2. The outputs of optical couplers OS–1 are coupled, via the Triac circuits depicted in FIG. 2, to output terminals h and i respectively.

A terminal k is connected to the positive side of the power supply (+VCC) which is in turn connected to each of the circuits IC–1 and IC–2, as well as to the optical couplers and transistors, as illustrated. A terminal 1 is connected to the negative side of the power supply (−VCC, having a level of zero volts) which is in turn also coupled to the circuits IC–1 and IC–2, as well as to the emitter of transistor Q3. Two further terminals m and n carry 120 volt AC; and terminal m is connected to each of the Triac circuits comprising Triacs TX–1 and TX–2 while terminal n represents a motor common line. Resistor R5, connected across the power supply between terminals m and n, is a heater operative to protect the circuit components of the interface unit in a humid environment. Its use is optional.

Considering now the operation of the FIG. 2 interface unit, let us initially assume that no signals are applied to terminals $a$–$g$. For purposes of explanation, the term "high" signal level will be used to designate a signal level which is substantially the same as that on line k, whereas a "low" signal condition corresponds to a voltage level corresponding to that on line 1. Under no signal conditions, all of terminals $a$–$g$ will be at a low signal level, but power would be present at terminals $k$–$n$ inclusive.

With input terminals a, b, and c at a low signal level, the output of gate G1 will be high; and this high output will be inverted by G4 to produce a low signal level at input d of gate G2. Since, for the no signal condition, input terminals e and f of gate G2 are also at a low signal level, the output of gate G2 will be high; and this signal condition will in turn be inverted to a low output condition at the output of gate G5 (and at one of the inputs to gate G6). Similarly, with terminal g at its low signal condition, all of the inputs to gate G3 will be low, and the resultant high output of gate G3 will be inverted by G7 to a low signal condition at the output of G7 and at the second input to gate G6.

Since the outputs of inverters G5 and G7 are both low, transistors Q1 and Q2 will both be turned off. For this signal condition, moreover, the output of gate G6 will be high, whereby transistor Q3 will be turned on. Transistor Q3 acts simply as a power supply return to transistors Q1 and Q2 and, for this condition of operation, permits either of transistors Q1 and Q2 to go on in response to appropriate signal conditions at the input terminals of the interface unit. When transistor Q3 is turned off, under the conditions to be described hereinafter, neither of transistors Q1 or Q2 can be energized.

For the no signal condition of operation described, the end result is that, without any signal inputs to gates G1 G2, or G3, transistors Q1 and Q2 are both off, no signals are supplied to the optical couplers OS–1 or OS–2, and the motor lines coupled to terminals h and i are not energized.

Let us now assume that the selected address lines connected to terminals a, b, c, the selected group line connected to terminal e, and the selected command line connected to terminal f, are energized simultaneously. Under these circumstances, the signal levels of each of terminals $a$–$f$ will go high. Since the three inputs to gate G1 are now high, the output of gate G1 will be low; and this low condition will be inverted by gate G4 to produce a high signal level at input terminal d of gates G2 and G3. Since input terminals e and f are also high, the output of gate G2 will go low; but since input terminal g is (for the assumed condition of operation) still low, the output of gate G3 will remain high. The low output from gate G2 is inverted by gate G5 to a high signal level at the base of transistor Q1, and at one of the inputs of gate G6. Since the output of gate G3 is high, the output of inverter G7 will remain low, causing transistor Q2 to remain in its off condition; and the low output of inverter G7 will cause the output of G6 to remain high, whereby transistor Q3 will remain on.

For this condition of operation, therefore, lamp L1 of optical coupler OS1 will be energized via transistors Q1 and Q3 in series; but lamp L2 of optical coupler OS2 will remain off.

The optical couplers employed are, in themselves, well known and commercially available. When lamp L1 is energized, light from the lamp shines on a photocell R1 whose resistance varies with the amount of light applied to its active surface. Since transistor Q1 acts only in an "on" or "off" mode, lamp L1 is similarly either on or off, and resistor R1 always sees the same amount of light when L1 is on. The resistance of R1 varies from approximately 0.5 megohms with L1 off, to approximately 500 ohms with L1 on. When L1 is off, the higher resistance of R1 limits the voltage from terminal m to a value below the turn-on at Triac TX1. With L1 on, the low resistance of R1 allows sufficient voltage to the gate of the Triac to turn it on; and the "on" resistance of R1 in series with R2 is actually low enough to turn the Triac full on. Resistor R2 limits the amount of current that can flow in the gate circuit of the Triac.

In short, when terminals $a$–$f$ inclusive are all energized, the "motor close" terminal h is energized from the power supply between terminals m and n to cause the controller (here assumed to be a motor) to operate in a particular sense, e.g., to close a valve.

An entirely analogous operation occurs if, when terminals $a$–$e$ are energized, we also energize the command control line connected to terminal g, rather than the other command control line connected to terminal f. For this alternative condition of operation, the output of gate G2 will remain high, whereas the output of gate G3 will go low. The output of inverter G5 will accordingly be low, and the output of inverter G7 will be high. Gate G6 and transistor Q3 will remain in the same condition of operation as has already been described; but since the output of inverter G7 is now high, transistor Q2 will conduct via transistor Q3. As a result, optical coupler OS2 will now be energized to apply power to output terminal *i* (rather than to output terminal *h*), to cause the motor to operate in a sense opposite to that earlier described, e.g., to open the valve connected thereto.

If all of terminals a through g should be energized simultaneously (which is an improper condition since, for the described conditions, only one of terminals *f* and *g* should be energized), the output of both of gates G2 and G3 will go low, and the output of inverters G5 and G7 will both go high. As a result, the output of gate G6 will go low, causing transistor Q3 to turn off. In this condition of operation, neither of transistors Q1 or Q2 can be turned on since their power supply returns are, in effect, both open; and therefore, neither of optical couplers OS1 or OS2 can be energized. In short, if both of terminals f and g should be energized simultaneously, both of the output terminals *h* and *i* will remain de-energized.

It may be, of course, that the motor or actuator employed is one which requires energization of both of terminals *h* and *i* simultaneously. This can be accomplished by a circuit of the general type shown in FIG. 2, simply by eliminating gate G6, resistor R7, and transistor Q3, and by returning the emitters of transistors Q1 and Q2 directly to terminal 1 (see FIG. 3). By this variation, both of transistors Q1 and Q2 could be rendered conductive simultaneously simply by energizing all of input terminals a-g inclusive at the same time. This same type of circuit modification could be employed, moreover, if it is desired to operate two separate controllers simultaneously fro output terminals *h* and *i*. For example, if separate controllers are coupled to terminals *h* and *i* respectively (each controller being provided with some type of automatic return, such as a spring, a pilot valve, or the like) energization of input terminal *f* (along with energization of the address and group control input terminals a-e) would energize the controller connected to output terminal *h*; energization of input terminal *g* would, under the same conditions, energize the separate controller or actuator connected to output terminal *i*; and simultaneous energization of input terminals *f* and *g* (along with the address and control group terminals) would control both controllers at the same time.

The particular circuit shown in FIG. 2 uses combination gates to perform an AND function, i.e., elements G1 and G4 act together as an AND gate, as do elements G2-G5 and G3-G7. This type of configuration permits the use of prepackaged, commercially available, HTL integrated circuits, and provides excellent immunity from noise produced by adjacent electrical interference such as motors and the like. If noise interference is not a serious problem, the combination gates G1-G4, G2-G5, and G3-G7 and be replaced by conventional AND gates operating at TTL or DTL logic levels.

In the particular interface circuit shown in FIG. 2, gate G1 has its three inputs a-c connected to three selected wires in the address control group 1 through 10, while gate G2 has its input e connected to only one of the four group control lines 11 through 14. This means, of course, that the remaining three group control lines are not being used at this time. If desired, parallel circuits entirely similar to G2-G5 could be supplied in the same interface unit for each of the other three group control lines, with the inputs of these parallel connected circuits being energized respectively by different ones of the group control lines as well as by the output of inverter G4. By such an arrangement, proper addressing of gate G1 could be used to control four different actuators simultaneously, or selectively, as desired. In effect, therefore, the interface unit shown in FIG. 2 could be modified so that its portions G2-G5 and G3-G7 are repeated two, three, or four times (for the assumed arrangement employing four group control lines).

Figure 3:
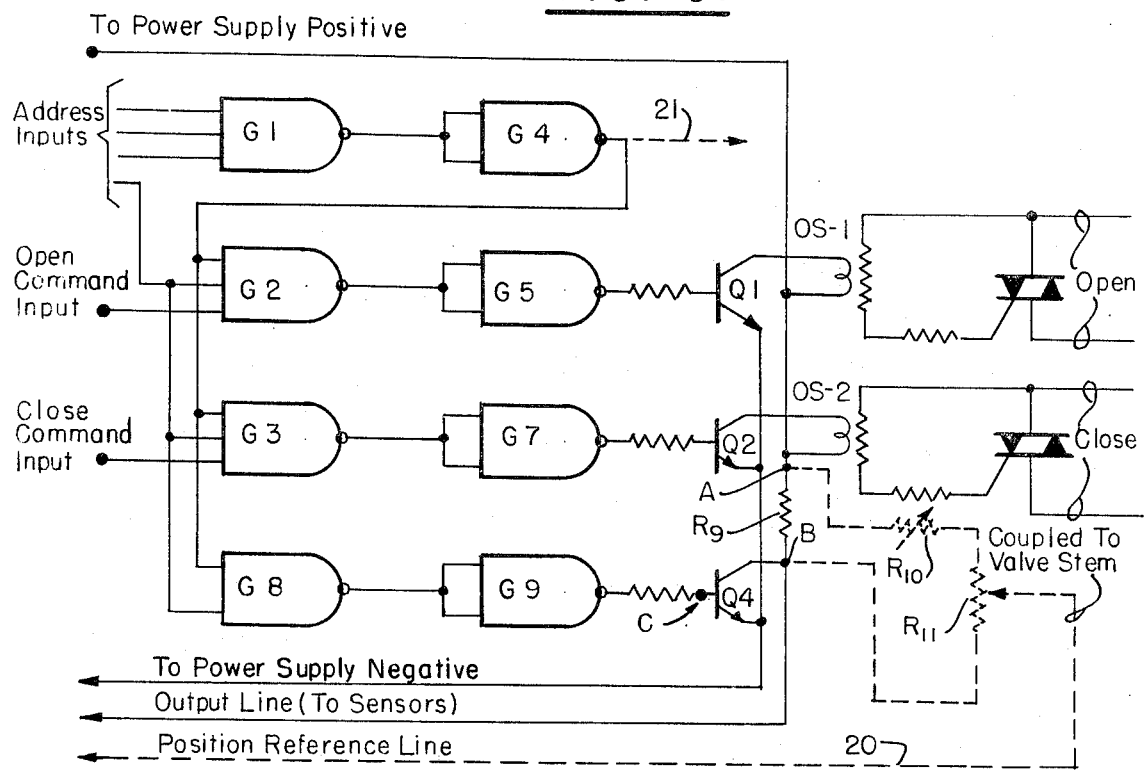
FIG. 3 depicts a modified interface unit constructed in accordance with the present invention, and including provision for position readout or sensor control.

When the coded address technique of the present invention is employed to control the operation of a large number of components, e.g., valves, it is often desirable to be able to determine the position of the controlled component or valve before and after the application of an "open" or "closed" command. Additionally, there may be sensors associated with the process from which information is derived to determine the necessity of operating a particular valve, and to determine which way that valve should be operated. It would therefore be convenient if the addressing of a particular valve (or controller) also called in a sensor associated with that valve (or controller). FIG. 3 illustrates an arrangement which is adapted to perform this function, i.e., when the device of FIG. 3 is correctly addressed, a further transistor (Q4) switches on an additional circuit that can be wired to feed back position information, or to provide a switched turn-on path for other external sensors.

Referring more particularly to FIG. 3, the combination gates G1-G4, G2-G5, and G3-G7, transistors Q1 and Q2, couplers OS-1 and OS-2, and the associated Triac circuits, all operate in the fashion described in reference to FIG. 2 (note in this respect that the safety circuit comprising gate G6 has been deleted in accordance with the variation already described). A further AND gate G8-G9 is provided, with one input of gate G8 being connected to the output of inverter G4, and the second input of gate G8 being connected to the group control line associated with gates G2 and G3. When the interface circuit is properly addressed at gates G1 and G2, therefore, gate G8-G9 will simultaneously operate to turn on transistor Q4. To activate external components, a resistor R9 could be connected in the circuit between points A and B to provide a voltage which switches from high to low in response to the application of a correct code at the address inputs of the interface unit; and the voltage change across resistor R9 could, in turn, be used to activate an appropriate external sensing instrument or instruments.

In order to provide a position reference signal, the resistor R9 can be eliminated and, in its place, a circuit comprising resistors R10, R11, and position reference line 20 can be provided. R11 comprises a potentiometer the arm of which is mechanically coupled to the stem of the valve whose position is being monitored. Rotation of the valve stem with transistor Q4 turned on accordingly causes the voltage on position reference line 20 to vary relative to the valve stem position. By connecting a calibrated meter to the position reference line 20, the position of the valve will be displayed each time that valve is addressed. Additionally, the varying voltage on the position reference line 20 could be applied to the feedback input of a set point controller to allow it to automatically position the valve in relation to the process deviation from the set point.

In FIG. 3, the channel G8-G9, employed to actuate a meter or turn on a sensing device or the like, is rendered operative only when gates G1 and G2 have been properly addressed, i.e., the circuit thus far described is, in effect, one where the channel G8–G9 is responsive to a proper input coding of four signals. This is not mandatory. For example, a similar function could be performed in response to a three input coding applied to gate G1 only, simply by connecting the output of the gate G1–G4 (as at 21) to a transistor similar to Q4.

Figure 4:
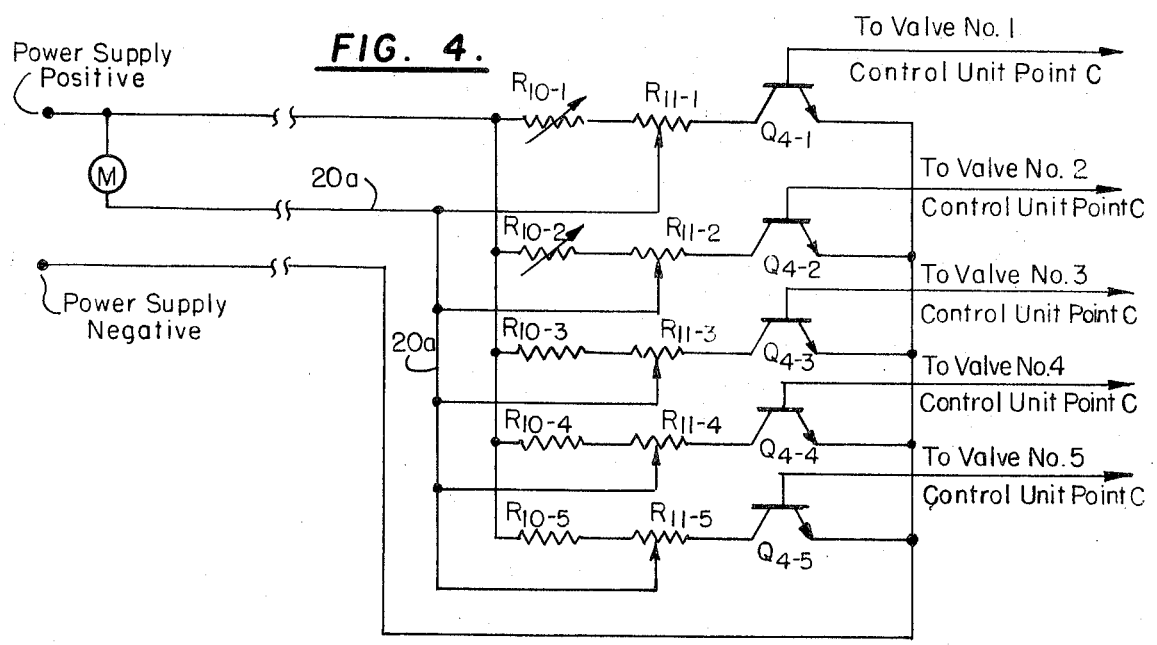
FIG. 4 is a schematic representation of a circuit adapted to permit the FIG. 3 circuit to provide position reference feedback from multiple controlled locations.

FIG. 4 illustrates how a single line can be used to provide position reference feedback from multiple valve (or controller) locations. A meter M is connected between the positive side of the power supply and a position reference line 20a which is common to all of the valves (there being five valves referred to in FIG. 4). No current will flow in the circuit of meter M until a Q4 transistor in a selected control unit is switched on by application of the correct address code to that unit. Five transistors $Q_{4-1}$, $Q_{4-2}$, $Q_{4-3}$, $Q_{4-4}$, and $Q_{4-5}$ have been depicted in FIG. 4 (in place of the single transistor Q4 of FIG. 3); and only that transistor which was switched on by the address code will cause current to flow in the meter circuit. The meter M will, therefore, read the position of the valve associated with the turned-on Q4 transistor. The several variable resistors $R_{10-1}$ through $R_{10-5}$ can be used to set full scale reading for each actuator location (thereby performing the function of resistor R10, in FIG. 3, for the single actuator referred to therein); and these resistors accordingly permit appropriate compensation to be made for the length of wiring employed to each actuator location. The several resistors R11–1 through R11–5 in FIG. 4 perform the function already described in reference to resistor R11 of FIG. 3.

While I have thus described preferred embodiments of the present invention, many variations will be apparent to those skilled in the art. Accordingly, the foregoing description is intended to be illustrative only and not limitative of the present invention; and all such variations and modifications as are in accord with the principles described, are meant to fall within the scope of the appended claims.

Having thus described my invention, I claim:

1. A control interface unit comprising first, second, and third AND gates each of which has a plurality of input terminals and at least one output terminal, a plurality of parallel control lines subdivided into first, second, and third distinct groups of lines, means for selectively energizing different ones of the lines in each of said groups of lines to designate a control function to be performed, means coupling the input terminals of said first gate to different selected ones of the control lines in said first group of lines respectively, means coupling the output terminal of said first gate in parallel to an input terminal of each of said second and third gates, means coupling selected ones of the lines in said second group of lines in parallel to all but one of the remaining input terminals of each of said second and third gates, means coupling a selected one of the lines in said third group of lines to the remaining input terminal of said second gate, means coupling a different selected one of the lines in said third group of lines to the remaining input terminal of said third gate, and at least one controller coupled to the output terminals of said second and third gates for performing a control function.

2. The interface unit of claim 1 wherein a single controller is coupled to the output terminals of both of said second and third gates, said single controller including means responsive to the comparative states of energization of said output terminals of said second and third gates for performing either of two different control functions.

3. The interface unit of claim 1 wherein each of said first, second, and third AND gates includes three input terminals.

4. The interface unit of claim 1 including a pair of Triacs coupled respectively to the output terminals of said second and third gates for energizing said controller.

5. The unit of claim 4 wherein each of said Triacs is coupled to its associated gate output terminal by means of an optical coupler.

6. The interface unit of claim 1 including a further gate having a pair of inputs coupled respectively to the output terminals of said second and third gates, said further gate being responsive to predetermined comparative states of energization of said second and third gate output terminals for producing a control signal, and means responsive to said control signal for preventing energization of said controller.

7. The interface unit of claim 1 including a further gate coupled to the output of said first gate for selectively producing a control signal operative to address a sensor disposed adjacent said controller.

8. The interface unit of claim 1 including a further gate having a pair of inputs coupled respectively to the output terminal of said first gate and to at least one of the control lines in said second group of lines for selectively producing an output signal operative to address a sensor associated with said controller.

9. The unit of claim 8 including a meter connected to said sensor.

10. The unit of claim 1 wherein each of said AND gates comprises a NAND gate having an inverter connected to its output, the output terminal of each AND gate comprising the output of its inverter.

11. The interface unit of claim 1 wherein said plurality of control lines are bundled together into a cable, said means for energizing different ones of said lines comprising the output of a computer.

12. The interface unit of claim 1 wherein said means for selectively energizing different ones of said lines comprises a control box located at a position remote from said interface unit.

13. A control interface unit comprising first, second, and third AND gates each of which has a plurality of input terminals and an output terminal, a plurality of control lines subdivided into at least first and second distinct groups of lines, means for selectively energizing different ones of the lines in each of said groups of lines to designate a control function to be performed, means coupling the input terminals of said first gate to different selected ones of the control lines in said first group of lines respectively, means coupling the output terminal of said first gate in parallel to a first input terminal of each of said second and third gates, means coupling other selected ones of the lines in said first group of lines in parallel to all but one of the remaining input terminals of each of said second and third gates, means coupling a selected one of the lines in said second group of lines to the remaining input terminal of said second gate, means coupling a different selected one of the lines in said second group of lines to the remaining input terminal of said third gate, and at least one controller coupled to the output terminals of said second and third gates for performing a control function in dependence upon the states of energization of the output terminals of said second and third gates.

14. The interface unit of claim 13 wherein said controller comprises a reversible motor coupled to the output terminals of both of said second and third gates.

15. The interface unit of claim 13 wherein two different controllers are coupled respectively to the output terminals of said second and third gates.

16. A control interface unit comprising first, second and third AND gates each of which has a plurality of input terminals and at least one output terminal, a plurality of parallel control lines, means for selectively energizing different ones of the lines to designate a control function to be performed, means coupling the input terminals of said first gate to selected ones of said control lines respectively, means coupling the output terminal of said first gate in parallel to an input terminal of each of said second and third gates, means coupling other selected ones of the lines in parallel to all but one of the remaining input terminals of each of said second and third gates, means coupling a further selected one of said lines to the remaining input terminal of said second gate, means coupling a still further selected one of said lines to the remaining input terminal of said third gate, and at least one controller coupled to the output terminals of said second and third gates for performing a control function.

* * * * *